US009569315B2

(12) United States Patent
Paskalev (10) Patent No.: US 9,569,315 B2
(45) Date of Patent: Feb. 14, 2017

(54) MODELING THE TOPOLOGY OF MANAGEMENT SERVERS IN A DISTRIBUTED SYSTEM (71) Applicant: VMware, Inc., Palo Alto, CA (US)

(72) Inventor: Tihomir Paskalev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 325 days.

(21) Appl. No.: 14/313,707

(22) Filed: Jun. 24, 2014

(65) Prior Publication Data
US 2015/0370640 A1 Dec. 24, 2015

(51) Int. Cl.
G06F 11/00 (2006.01)
G06F 11/14 (2006.01)
G06F 11/20 (2006.01)

(52) U.S. Cl.
CPC .......... G06F 11/1484 (2013.01); G06F 11/202 (2013.01)

(58) Field of Classification Search
CPC . G06F 11/3048; G06F 11/1484; G06F 11/202; H04L 41/12; H04L 41/02
See application file for complete search history.

(56) References Cited

U.S. PATENT DOCUMENTS

| 2002/0048263 A1* | 4/2002 | Fieremans | H04L 41/12 370/254 |
| 2007/0171844 A1* | 7/2007 | Loyd | H04L 45/02 370/254 |
| 2009/0113109 A1* | 4/2009 | Nelson | G06F 11/203 711/6 |
| 2013/0191688 A1* | 7/2013 | Agarwal | H04L 41/12 714/32 |

* cited by examiner

Primary Examiner — Jason Bryan
(74) Attorney, Agent, or Firm — Patterson & Sheridan LLP (57) ABSTRACT Techniques disclosed herein enable efficient creation of models that represent connection topology of virtual machine (VM) management servers and site recovery manager (SRM) servers configured to provide VM recovery services across multiple locations. In operation, an SRM topology unit initializes a model to represent a VM management server. The SRM topology unit expands the model to represent a first SRM server that is logically connected to the VM management server and supports VM recovery at a first location. The SRM topology unit further expands the model to reflect a pairing relationship between the first SRM server and a second VM management server that supports VMs at a second location. Creating an easily-comprehended model in this hierarchical and automated fashion improves on conventional techniques where holistically evaluating the connection topology is predominantly a tedious and error-prone manual process.

23 Claims, 4 Drawing Sheets

MODELING THE TOPOLOGY OF MANAGEMENT SERVERS IN A DISTRIBUTED SYSTEM

BACKGROUND

Virtualization management software allows multiple virtual machines (VMs) to execute on a single hardware computing platform. Each VM is an abstraction of a physical computing system and executes a "guest" operating system. Virtualization management software also manages how hardware computing resources are allocated to each VM. A group of hardware computing platforms may be organized as a cluster to provide the hardware computing resources for VMs. In a data center, it is common to see hundreds, even thousands, of VMs running on multiple clusters of host servers.

When a server cluster at one location fails, the virtual infrastructure at that location may be recovered at a remote location through a disaster recovery process. Such disaster recovery restarts the entire data center (or a portion thereof) at the remote location by replicating the virtual infrastructure at the remote location. Commercially available disaster recovery products include VMware® vCenter™ Site Recovery Manager™.

In some disaster recovery products, site recovery manager (SRM) servers provide disaster recovery services to virtual machines (VMs) managed by a VM management server. SRM servers work in pairs—one of the SRM servers in the pair is registered to (i.e., works with) a VM management server at the "protected" site, and the other SRM server in the pair is registered to a VM management server at the "recovery" site. Notably, multiple SRM servers at the recovery site that communicate with corresponding SRM servers at the protected site may be registered to a single VM management server. Such a configuration may be employed during an N-to-1 disaster-recovery setup.

Efficiently configuring the VM management servers and SRM servers (e.g., optimizing pairings, registrations, etc.) requires understanding and manipulating the topology of the servers deployed across the sites. Traditional approaches to configuring the VM management servers and SRM servers focus on a single registration or pairing in isolation. Such a myopic approach does not facilitate efficient re-configuration in the event of errors or optimizing recovery workflows. For example, in some disaster recovery products, when one of the SRM servers in a pair is unavailable, the traditional approaches do not facilitate identification of holistic options, such as other SRM servers that are reachable from the available SRM server in the pair. Instead, understanding the broader topology and then identifying candidates for re-assignment and/or re-pairing is a manual process that is tedious and can negatively affect user experience and efficient execution of disaster recovery workflows.

DETAILED DESCRIPTION

Figure 1:
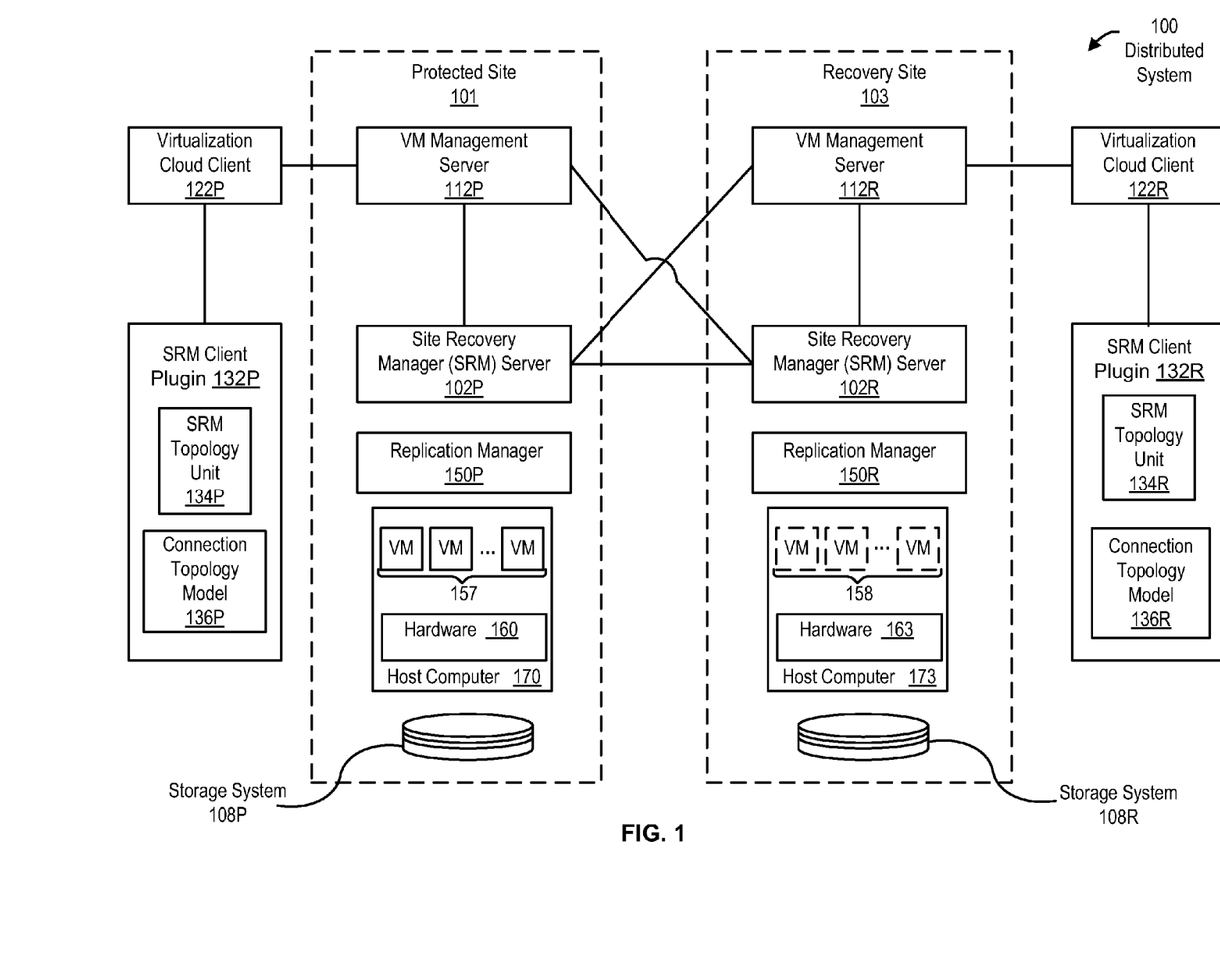
FIG. 1 illustrates components of a distributed system to execute disaster recovery workflows, in which embodiments are implemented.

FIG. 1 illustrates components of a distributed system 100 to execute disaster recovery workflows, in which embodiments are implemented. As shown, distributed system 100 includes a protected site 101 and a recovery site 103. In alternate embodiments, distributed system 100 may include any number of protected sites 101, any number of recovery sites 103, and the number or protected sites 101 may or may not equal the number of recovery sites 103.

Protected site 101 includes a host computer 170, shared storage 108P, a VM management server 112P, a site recovery manager (SRM) server 102P, and a replication manager 150P. At protected site 101, virtual machines 157 are instantiated on host computer 170. Host computer 170 includes virtualization software (not shown) and hardware 160 (e.g., host computer 170 includes one or more CPUs and system memory), and host computer 170 is coupled to shared storage 108P. Virtualization software performs system resource management and virtual machine resource emulation. Virtual machine resource emulation may be performed by a virtual machine monitor (VMM) component (not shown) implemented as part of the virtualization software. In some implementations, each virtual machine 157 may have a corresponding VMM instance. Depending on implementation, virtualization software may be unhosted or hosted. Unhosted virtualization software generally relies on a specialized virtualization kernel for managing system resources, whereas hosted virtualization software relies on a commodity operating system—the "hosting operating system"—such as Windows®, Mac OS X®, or Linux® to manage system resources.

Each VM 157 includes a respective virtual machine disk (VMDK) which may be stored in shared storage 108P. In some embodiments the VMDK is stored in local attached storage (not shown). For purposes of disaster recovery, shared storage 108P, and in particular portions of shared storage 108P storing VM files and configuration files, are replicated to a shared storage 108R at recovery site 103. Replication manager 150P is configured to perform storage replication. In one embodiment, replication manager 150P is a VMware® vSphere® Replication Manager. In other embodiments, other techniques, such as array-based replication, may be used for storage replication instead of or in conjunction with VMware® vSphere® Replication Manager.

VM management servers 112P manage VMs 157. In one embodiment, VM management server 112P is a VMware® vCenter™ server. SRM server 102P provides disaster-recovery service to VMs 157 managed by VM management server 112P. More specifically, if a disaster occurs at protected site 101 (e.g., the data center running VM management server 112P experiences a power outage), then SRM server 102R at recovery site 103 executes a preconfigured recovery plan that recreates VMs 157 (running as VMs 158) and the virtual infrastructure at recovery site 103. An SRM topology unit 134P generates an efficient model—a connection topology model 136P—that facilitates visualization of the entire connection network of available SRM servers 102 and VM management servers 112. In some embodiments, SRM topology unit 134P may execute as a background process, periodically performing updates to reflect dynamic changes in the connectivity or availability of SRM servers 102 and VM management servers 112. In other embodiments, SRM topology unit 134P may execute in response to user commands.

To enable disaster-recovery services, the user installs a virtualization cloud client 122R, such as VMware® vSphere® client, that allows the user to configure VM management servers 112R, and an SRM client plugin 132R that allows the user to configure SRM management servers 102R. Subsequently, the user registers (i.e., logically connects) SRM server 102P to VM management server 112P at protected site 101. Similarly, the user registers (i.e., logically connects) SRM server 102R to VM management server 112R at recovery site 103. Each SRM server 102P, 102R provides disaster recovery services at a particular location (i.e. protected site 101 or recovery site 103) to the VM management server 112P, 112R to which the SRM server 102P, 102R is registered. To enable disaster recovery between protected site 101 and recovery site 101, the user configures SRM server 102P and SRM server 102R to work as a "pair." This pairing creates a reciprocal relationship between SRM server 102P and SRM server 102R, and following the pairing SRM server 102P and SRM server 102R provide recovery services to each other.

In the embodiment depicted in FIG. 1, at protected site 101, a single SRM server 102P is registered to a single VM management server 112P, and at recovery site 103, a single SRM server 102R is registered to a single VM management server 112R. The server topology is completed by the pairing of SRM server 102P and SRM server 102R. In general, at recovery site 103, any number of SRM servers 102R may be registered to a single VM management server 112R, and each VM management server 112R may manage any number of VMs 158. For example, as part of establishing an N-to-1 disaster recovery setup, multiple SRM servers 102R may be registered to a single VM management server 112R at recovery site 103, and each SRM server 102P at protected site 101 is paired with a single SRM server 102R at recovery site 103 in a reciprocal, 1-to-1 relationship. Further, distributed system 100 may include any number of VM management servers 112, distributed in any fashion between protected sites 101 and recovery sites 103. Each VM management server 112R may be deployed as a standalone instance or as part of a federation of VM management servers 112R, in a topology referred to as a "linked mode."

According to embodiments, SRM topology unit 134P is executed as part of SRM client plugin 132P to discover logical connections to VM management servers 112P, 112R and SRM servers 102P, 102R, and create and update connection topology model 136P. Connection topology model 136P represents the network connection topology of VM management servers 112P, 112R and SRM servers 102P, 102R in a manner that is easy to comprehend. As part of optimization efforts, the user may traverse connection topology model 136P to develop a holistic view of the deployment and arrangement of VM management servers 112P, 112R and SRM servers 102P, 102R. In some embodiments, after any modifications that affect the topology, such as user-initiated re-pairing, the user may signal SRM topology unit 134P to update connection topology model 136P.

To easily identify any changes to logical connections between VM management servers 112 and SRM servers 102, SRM topology unit 134P may maintain a reachability graph model. Such a change occurs when SRM server 102 becomes registered/unregistered to VM management server 112 or paired/unpaired from another SRM server 102. The reachability graph model represents logical relationships between a set of initial VM management servers, additional VM management servers 112, and SRM servers 102 in an easily-traversed collection of nodes and directed edges. In some embodiments, if a reachability graph update indicates that a relationship involving a previously existing node representing either VM management server 112 or SRM server 102 has changed, then SRM topology unit 134P generates a notification signal.

Figure 2A:
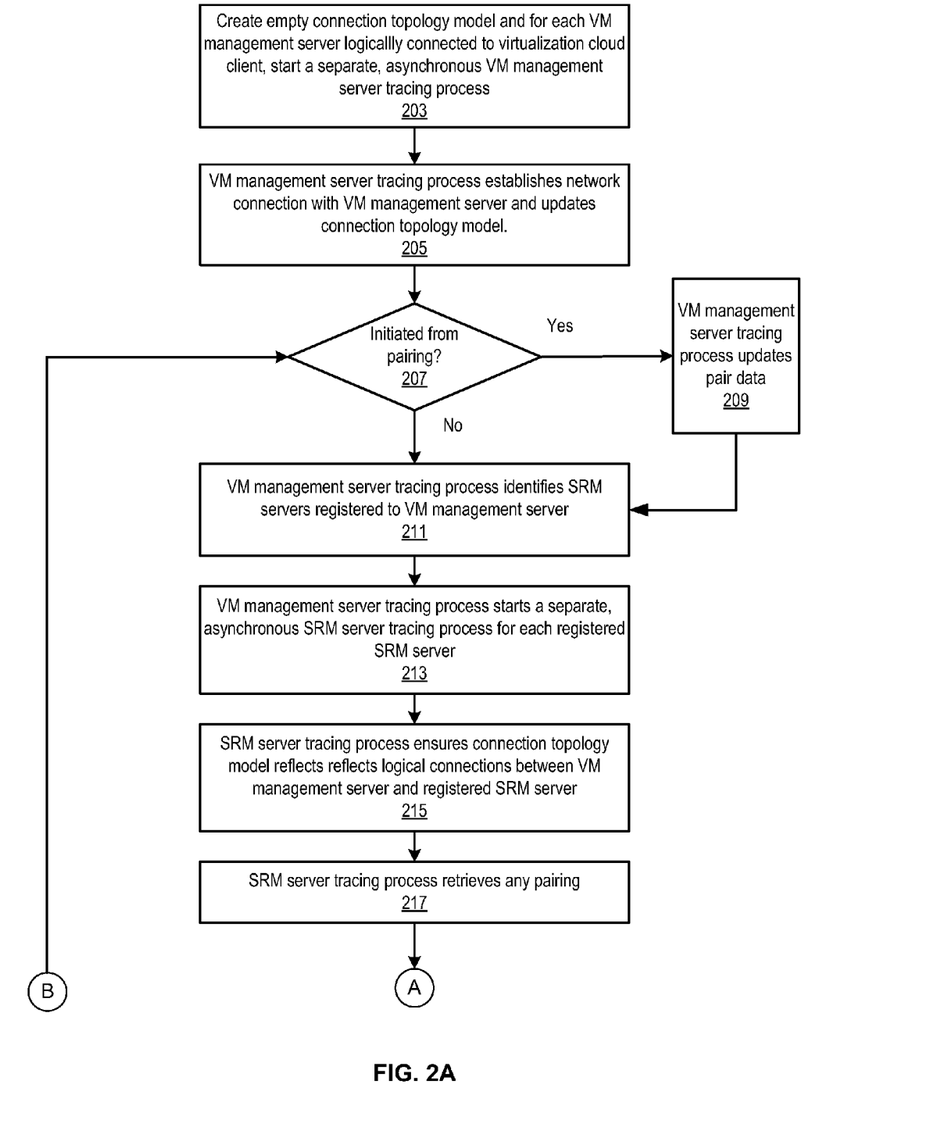
FIGS. 2A-2B illustrate a method for creating a model that represents a connection topology of servers, according to an embodiment.
Figure 2B:
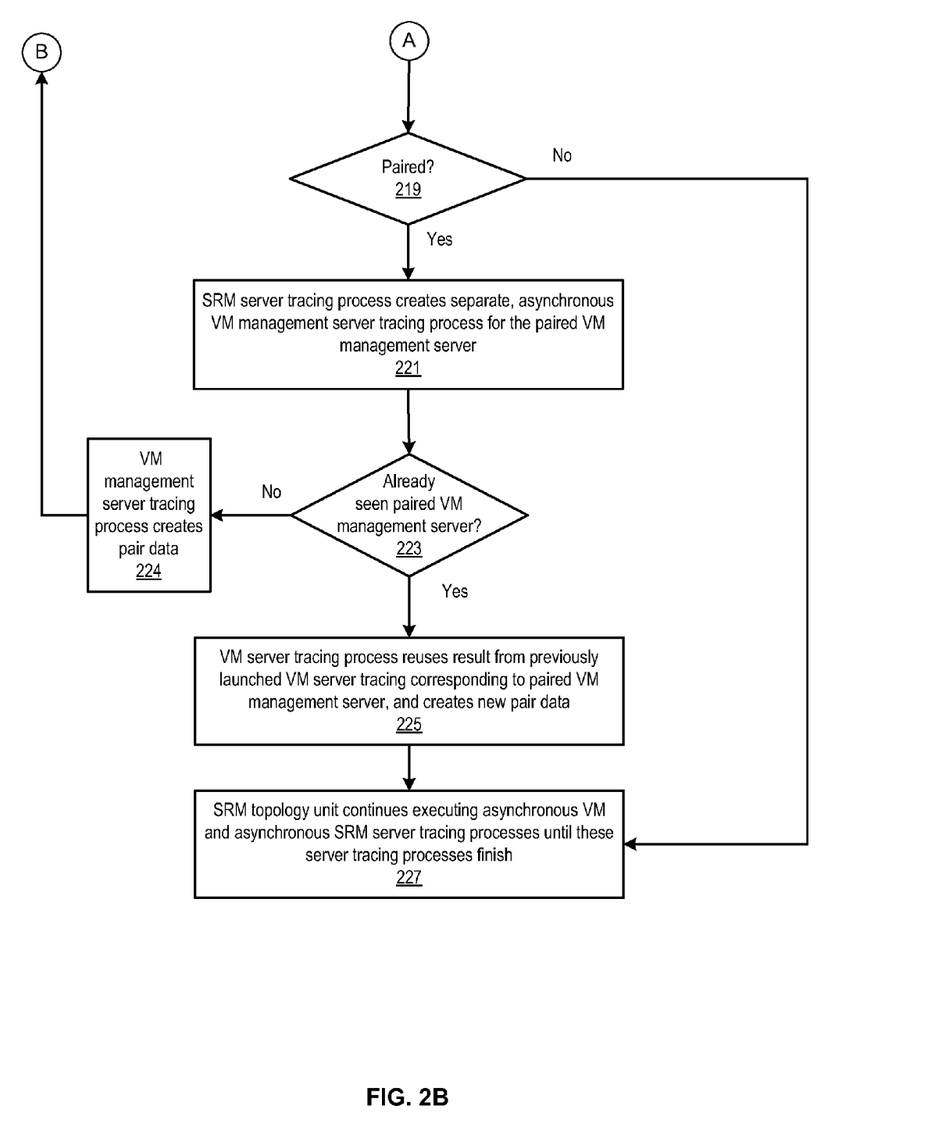

FIGS. 2A-2B illustrate a method for creating a model that represents a connection topology of servers, according to an embodiment. For explanatory purposes only, the steps in this method are performed within distributed system 100 of FIG. 1 and executed by SRM topology unit 134P.

However, in general, the steps in this method may be performed where protected site 101 includes any number of SRM servers 102P and any number of VM management servers 112P and where recovery site 103 includes any number of SRM servers 102R and any number of VM management servers 112. In some embodiments, multiple SRM servers 102P or 102R may be registered to a single VM management server 112P or 112R. Further, there may be multiple number of protected sites 101 and recovery sites 103 configured in a variety of different topologies to implement different disaster recovery plans. The steps in this method may be expanded to support the modeling of any technically feasible server topology.

Responding to a new pairing relationship is not included as part this method, but a new pairing relationship triggers the method steps to be re-executed. More specifically, when a user initiates a pairing and the pairing completes successfully, this method is repeated so that paired VM management server 112 and any SRM servers 102 that are registered to paired VM management server 112 are correctly represented in connection topology model 136P. Typically, to initiate a pairing, the user enters the remote address of the paired VM management server 112. However, VM management servers 112 identify registered SRM servers 102 using local network addresses. Consequently, a single VM management server 112 or a single SRM server 102 may be referred to using different addresses. For example, if VM management server 112 is associated with multiple SRM servers 102, VM management server 112 may be known under an IP address in one remote SRM server 102 and under a FQDN (DNS) address in another remote SRM server 102.

To ensure a one-to-one identifier for VM management servers 112 and SRM server 102s, SRM topology units 134 use the UUIDs of the VM management servers 112 and SRM servers 102 as identifiers. In alternate embodiments UUIDs may be replaced with any identification system that assigns a single, unique identifier to each VM management server 112 and SRM server 102.

This method begins at step 203, where SRM topology unit 134P creates and initializes connection topology model 136P. As part of the initialization, SRM topology unit 134P designates the set of VM management servers 112P that are configured with virtualization cloud client 122P as a set of initial VM management servers. For each VM management server 112P included in this set of initial VM management servers, SRM topology unit 134P creates a separate, asynchronous VM management server tracing process. The context of this method includes only a single initial VM management server and, consequently, SRM topology unit 134P launches a single VM management server tracing process at step 203. By contrast, in alternate embodiments, SRM topology unit 134P creates multiple, asynchronous VM management server tracing processes during step 203. In such embodiments, each of the VM management server tracing processes executes independently through the steps in this method.

At step 205, the VM management server tracing process maps VM management server 112 to a universally unique identifier (UUID). The VM management server tracing process then connects to VM management server 112. As part of connecting to VM management server 112, VM management server 112 authenticates the user credentials (i.e., the VM management server tracing process "authenticates before" VM management server 112). If the mapping, connection, or authentication fails, then the VM management server tracing process ceases execution, however other VM management server tracing processes may continue to execute.

The VM management server tracing process then creates a new set of VM management server data (included in connection topology model 136P), setting a VM management server field to reference VM management server 112, thus specifying that this set of data is associated with VM management server 112. At step 207, the VM management server tracing process determines whether the VM management server tracing process initiated from a pairing. Such a scenario does not occur on the initial pass, only on subsequent passes after tracing a pair of SRM management servers 102 through a registration to VM management server 112. If the VM management server tracing process determines that the VM management server tracing process did not initiate with a pairing, then this method proceeds directly to step 211.

If, at step 207, the VM management server tracing process determines that the VM management server tracing process initiated with a pairing, then this method proceeds to step 209. At step 209, the VM management server tracing process updates pair data included in connection topology model 136P to specify VM management server 112 as a paired VM management server. Notably, by deferring the assignment of the paired VM management server, VM management server tracing process connects to VM management server 112 prior to updating the pair data, ensuring the integrity of connection topology model 136P throughout the building process. This method then proceeds to step 211.

At step 211, the VM management server tracing process identifies SRM servers 102 that are registered to VM management server 112. For each of these identified SRM servers 102, the VM management server tracing process creates a separate, asynchronous SRM server tracing process (step 213). In the context of this method, only one SRM server 102 is registered to VM management server 112 and, consequently, the VM management server tracing process creates one SRM server tracing process at step 213. By contrast, in alternate embodiments, the VM management server tracing process creates multiple, asynchronous SRM server tracing processes during step 213. In such embodiments, each of the SRM server tracing processes executes independently through the steps in this method.

At step 215, the SRM server tracing process ensures connection topology model 136P reflects SRM server 102. As part of ensuring the integrity of the connection topology model 136P, the SRM server tracing process maps SRM server 102 to a UUID. The SRM server tracing process then connects to SRM server 102. Connecting to SRM server 112 is contingent, among other things, on successfully authenticating before SRM server 102. If the SRM server tracing process fails to map SRM server 102 to a UUID or is unable connect to SRM server 102, then the SRM server tracing process ceases execution. However, VM management server tracing processes and other SRM server tracing processes may continue to execute.

The SRM server tracing process then creates a new SRM server data (included in connection topology model 136P), setting a SRM server field to reference SRM server 102. The SRM server tracing process also updates the connection topology model 136P to reflect the registration of SRM server 102 to VM management server 112. In particular, the SRM server tracing process adds a reference to the SRM server data corresponding to SRM server 102 to a list of registered SRM server data corresponding to SRM servers that is included in the VM management server data corresponding to VM management server 112. Further, the SRM server tracing process sets a single registered VM management server field that is included in the SRM server data to reference the VM server data corresponding to VM management server 112. In this fashion, the SRM server tracing process ensures that connection topology model 136P correctly and unambiguously includes the relationship between SRM server 102 and VM management server 112 to which SRM server 102 is registered.

At step 217, the SRM server tracing process retrieves any pairing information. At step 219, if the SRM server tracing process determines that SRM server 102 is not paired, then this method proceeds directly to step 227. If, at step 219, the SRM server tracing process determines that SRM server 102 is paired, then this method proceeds to step 221. At step 221, the SRM server tracing process starts a new, separate, asynchronous VM management server tracing process corresponding to the particular VM management server 112 with which SRM server 102 is paired. At step 223, the new VM management server tracing processes uses UUIDs to determine whether the SRM topology unit 134P is already processing the corresponding VM management server 112 or the corresponding VM management server 112 is already included in connection topology model 136P

If, at step 223, the VM management server determines that no VM management server tracing process is tracing or has traced VM management server 112, then the method proceeds to step 224, where the VM management server tracing process creates a new pair data. This method then returns to step 207, where the VM management server tracing process continues to incrementally build connection topology model 136P. SRM topology unit 134P continues to execute steps 207-224, launching VM management server tracing processes and SRM server tracing processes until the final SRM server tracing process determines that SRM server 102 is not paired (at step 219) or the final VM server tracing process determines that the corresponding VM management server 112 is already included in connection topology model 136P (at step 223).

At step 223 if the VM server tracing process determines that a VM management server tracing process is tracing or has traced VM management server 112, then this method proceeds to step 225. At step 225, the VM server tracing process reuses the results from the previous VM management server tracing process and creates a new pair data.

At step 227, SRM topology unit 134P continues to execute VM management server tracing processes and SRM server tracing processes that incrementally build connection topology model 136P until the all the VM management server tracing processes and SRM server tracing processes have completed executing.

Connection topology model 136P created during steps 203-227 is an hierarchical structure with a predetermined lifetime. During this lifetime, connection topology model 136P is considered up-to-date and available for use. After this lifetime has elapsed, connection topology model 136P is superseded by a new connection topology model 136P. SRM topology unit 134P incrementally updates each new connection topology model 136P. More specifically, SRM topology unit 134P adds newly discovered VM management servers 112 and SRM servers 102 to connection topology model 136P as, respectively, VM management server data and SRM server data. SRM topology unit 134P also incrementally updates the connection topology model 136P to represent the relationships of any discovered VM management servers 112 and SRM servers 102 to each other and to previously discovered VM management servers 112 and SRM servers 102. Such updates may include modifying, adding, or deleting any number of VM management server data, SRM server data, and pair data. Finally, SRM topology unit 134P enables clients to retrieve the information included in connection topology model 136P via a server interface to connection topology model 136P.

The server interface enables clients to retrieve VM management server data and SRM server data based on the UUID of the corresponding VM management server 112 and SRM server 102. The server interface also leverages connection topology model 136P to enable clients to traverse connections starting from the initial VM management servers.

Clients may access data included in connection topology model 136P before SRM topology unit 134P finishes building connection topology model 136P. If a client attempts to retrieve information regarding a particular VM management server 112 or SRM server 102, then SRM topology unit 134P blocks the client until the corresponding VM management server data or SRM server data is available or until SRM topology unit 134P finishes building connection topology model 136P.

In some embodiments, SRM topology unit 134P is configured to regenerate connection topology model 136P upon receiving an update signal. The update signal may be generated in any technically feasible fashion and may be periodic. In one example, the user may modify one or more pairing assignments and assert the update signal to prompt SRM topology unit 134P to correct the now out-of-date connection topology model 136P.

Since each UUID is distinct, some embodiments leverage UUIDs to reuse server tracing processes and connections. For example, for each address of VM management server 112/SRM server 102 the SRM topology unit 134 adds to connection topology 136, SRM topology unit 134 establishes a new connection to discover the UUID of VM management server 112/SRM server 102. Once SRM topology unit 134 retrieves this UUID, SRM topology unit 134 compares this UUID a set of known UUIDs to determine whether this SRM topology unit 134 has previously processed VM management server 112/SRM server 102. If SRM topology unit 134 has previously processed VM management server 112/SRM server 102, then SRM topology unit 134 re-uses the previously created connection. In general, using the UUID in this manner enables SRM topology unit 134 to maintain only a single set of data per VM management server 112/SRM server 102.

In such embodiments, by labelling each server tracing process with the corresponding UUID, SRM topology unit 134P may asynchronously execute different server tracing processes without corrupting connection topology model 136P. Further, SRM topology unit 134P may delay running a server tracing process with the same UUID of a running server tracing process—re-using the results of the running server tracing process instead of re-running the server tracing process.

Figure 3:
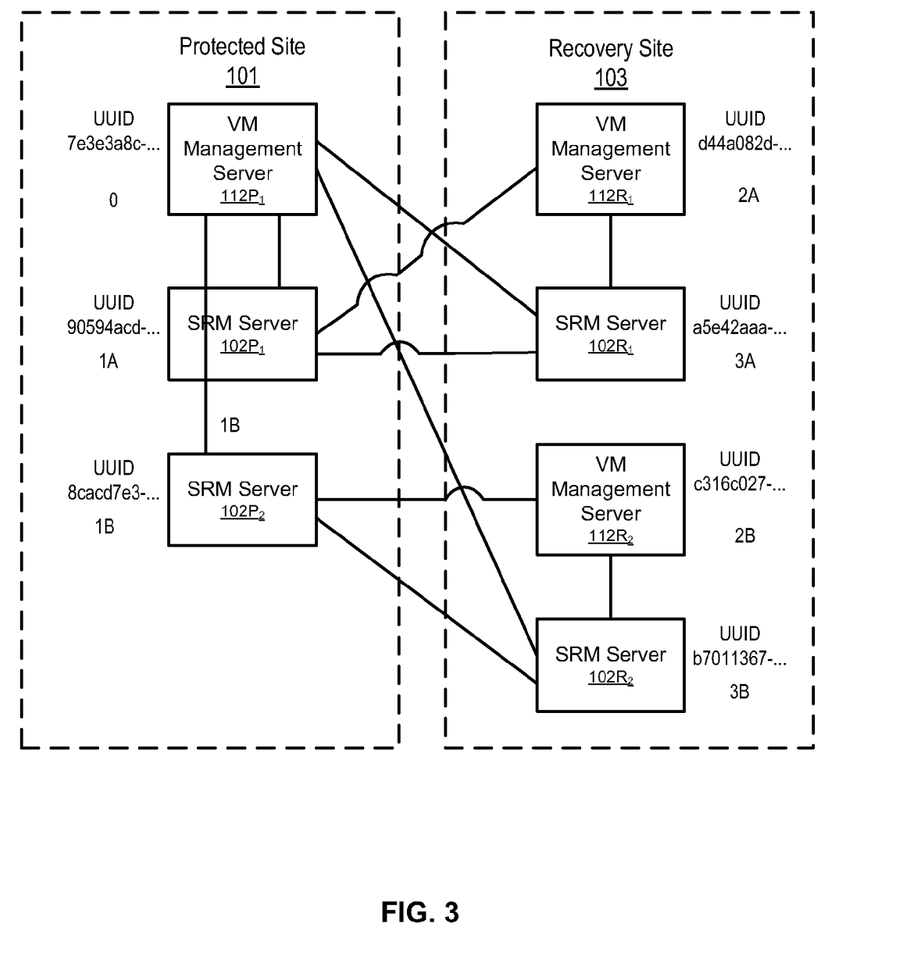
FIG. 3 illustrates the order in which SRM topology unit connects to virtual machine (VM) servers and site recovery management (SRM) servers.

FIG. 3 illustrates the order in which SRM topology unit 134P connects to virtual machine (VM) servers 112 and site recovery management (SRM) servers 102. For explanatory purposes only, the distributed system depicted in FIG. 3 includes one protected site 101 and one recovery site 103. At protected site 101, two SRM servers $102P_{1-2}$ are registered to a single VM management server $112P_1$. Each SRM server $102P_{1-2}$ at protected site 101 is paired with a separate SRM server $102R_{1-2}$. At recovery site 103, each SRM server $102R_{1-2}$ is registered to a separate VM management server $112R_{1-2}$. This represents a 1-to-2 disaster-recovery configuration.

Each VM management server 112 and SRM server 102 is annotated with a corresponding UUID and a connection order, and registrations and pairings are depicted with sold lines. The connection order is the relative order in which SRM topology unit 134P connects to VM management servers 112 and SRM servers 102 following the method steps detailed in conjunction with FIG. 2. SRM topology unit 134P performs certain tasks at least partially in parallel. Accordingly, FIG. 3 depicts two separate sequences. Both sequences start with connection order "0," the "A" connection order annotations indicate the relative connection order of one sequence, and the "B" connection order annotations indicate the relative connection order of another sequence.

SRM topology unit 134P initially connects to VM management server $112P_0$ (UUID "7e3a3a8c- . . . " and connection order "0"). The "A" sequence indicates that SRM topology unit 134P then connects to SRM server $102P_1$ (UUID "90594acd- . . . " and connection order "1A"), VM management server $112R_1$ (UUID "d44a082d- . . . " and connection order "2A"), and finally SRM server $102R_1$ (UUID "a5e42aaa- . . . " and connection order "3A"). In parallel, the "B" sequence indicates that SRM topology unit 134P connects to SRM server $102P_2$ (UUID "8cacd7e3" and connection order "1B"), VM management server $112R_2$ (UUID "c316c027- . . . " and connection order "2B"), and finally SRM server $102R_2$ (UUID "b7011367- . . . " and connection order "3B").

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method of creating a model that represents connection topology of virtual machine (VM) management servers and recovery management servers in a distributed system, comprising:
   selecting a first VM management server;
   initializing the model to represent the first VM management server;
   determining a logical connection from the first VM management server to a first recovery management server that provides recovery services to VMs at a first location;
   expanding the model to represent the first recovery management server and the logical connection from the first VM management server to the first recovery management server;
   determining a logical connection from the first recovery management server to a second VM management server based on a pairing relationship, wherein the second VM management server supports VMs at a second location;
   expanding the model to represent the second VM management server and the logical connection from the first recovery management server to the second VM management server; and
   receiving lookup or traversal operations on the model and, in response thereto, delaying lookup or traversal operations that target the first VM management server until a tracing process related to the first VM management server finishes executing.

2. The method of claim 1, wherein the logical connection from the first VM management server to the first recovery management server is determined if the first recovery management server is registered to the first VM management server.

3. The method of claim 1, further comprising:
   determining a universally unique identifier (UUID) for each VM management server and recovery management server represented in the model, and generating an interface that provides access to the model.

4. The method of claim 1, further comprising:
   creating and maintaining a reachability graph model, wherein the reachability graph model represents VM management servers and recovery management servers as nodes, and logical connections as directed edges; and
   determining that one of the directed edges has changed and, in response thereto, generating a notification signal.

5. The method of claim 1, further comprising:
   selecting a third VM management server;
   expanding the model to represent the third VM management server;
   determining a logical connection from the third VM management server to a second recovery management server that supports VM recovery at the first location; and
   expanding the model to represent the second recovery management server and the logical connection from the third VM management server to the second recovery management server.

6. The method of claim 1, wherein a first tracing process establishes a network connection to the first VM management server, a second tracing process establishes a network connection to a third VM management server, and the first tracing process and the second tracing process execute at least partially in parallel.

7. The method of claim 1,
   wherein the lookup or traversal operations on the model that target the first VM management server is delayed, while executing lookup or traversal operations that target a third VM management server.

8. A computer system distributed across multiple locations, comprising:
   a processor;
   virtual machines (VMs), VM management servers that support VMs, and recovery management servers that support recovery of VMs; and a memory, wherein the memory includes a program that creates a model that represents connection topology of VM management servers and recovery management servers, the program comprising:
selecting a first VM management server;
initializing the model to represent the first VM management server;
determining a logical connection from the first VM management server to a first recovery management server that provides recovery services to VMs at a first location;
expanding the model to represent the first recovery management server and the logical connection from the first VM management server to the first recovery management server;
determining a logical connection from the first recovery management server to a second VM management server based on a pairing relationship, wherein the second VM management server supports VMs at a second location;
expanding the model to represent the second VM management server and the logical connection from the first recovery management server to the second VM management server; and
receiving lookup or traversal operations on the model and, in response thereto, delaying lookup or traversal operations that target the first VM management server until a tracing process related to the first VM management server finishes executing.

9. The computer system of claim 8, wherein the logical connection from the first VM management server to the first recovery management server is determined if the first recovery management server is registered to the first VM management server.

10. The computer system of claim 8, wherein the program further comprises:
determining a universally unique identifier (UUID) for each VM management server and recovery management server represented in the model, and generating an interface that provides access to the model.

11. The computer system of claim 8, wherein the program further comprises:
creating and maintaining a reachability graph model, wherein the reachability graph model represents VM management servers and recovery management servers as nodes, and logical connections as directed edges; and
determining that one of the directed edges has changed and, in response thereto, generating a notification signal.

12. The computer system of claim 8, wherein the program further comprises:
selecting a third VM management server;
expanding the model to represent the third VM management server;
determining a logical connection from the third VM management server to a second recovery management server that supports VM recovery at the first location; and
expanding the model to represent the second recovery management server and the logical connection from the third VM management server to the second recovery management server.

13. The computer system of claim 8, wherein a first tracing process establishes a network connection to the first VM management server, a second tracing process establishes a network connection to a third VM management server, and the first tracing process and the second tracing process execute at least partially in parallel.

14. The computer system of claim 8, wherein the program further comprises:
wherein the lookup or traversal operations on the model that target the first VM management server is delayed, while executing lookup or traversal operations that target a third VM management server.

15. A non-transitory computer-readable storage medium comprising instructions, which when executed in a computer system distributed across multiple locations and including virtual machine (VM) management servers and recovery management servers at each location, causes the computer system to carry out the steps of:
selecting a first VM management server;
initializing the model to represent the first VM management server;
determining a logical connection from the first VM management server to a first recovery management server that provides recovery services to VMs at a first location;
expanding the model to represent the first recovery management server and the logical connection from the first VM management server to the first recovery management server;
determining a logical connection from the first recovery management server to a second VM management server based on a pairing relationship, wherein the second VM management server supports VMs at a second location;
expanding the model to represent the second VM management server and the logical connection from the first recovery management server to the second VM management server; and
receiving lookup or traversal operations on the model and, in response thereto, delaying lookup or traversal operations that target the first VM management server until a tracing process related to the first VM management server finishes executing.

16. The non-transitory computer-readable storage medium of claim 15, wherein the logical connection from the first VM management server to the first recovery management server is determined if the first recovery management server is registered to the first VM management server.

17. The non-transitory computer-readable storage medium of claim 15, further comprising:
determining a universally unique identifier (UUID) for each VM management server and recovery management server represented in the model, and generating an interface that provides access to the model.

18. The non-transitory computer-readable storage medium of claim 15, further comprising:
creating and maintaining a reachability graph model, wherein the reachability graph model represents VM management servers and recovery management servers as nodes, and logical connections as directed edges; and
determining that one of the directed edges has changed and, in response thereto, generating a notification signal.

19. The non-transitory computer-readable storage medium of claim 15, further comprising:
selecting a third VM management server;
expanding the model to represent the third VM management server;

determining a logical connection from the third VM management server to a second recovery management server that supports VM recovery at the first location; and expanding the model to represent the second recovery management server, and the logical connection from the third VM management server to the second recovery management server.

20. The non-transitory computer-readable storage medium of claim 15, wherein a first tracing process establishes a network connection to the first VM management server, a second tracing process establishes a network connection to a third VM management server, and the first tracing process and the second tracing process execute at least partially in parallel.

21. The method of claim 1, wherein the first location is a protected site for disaster recovery and the second location is a recovery site for disaster recovery that is remotely located relative to the protected site,
the protected site including the first VM management server, the first recovery management server, and a first host computer in which the VMs at the first location are running, and
the recovery site including the second VM management server, a second recovery management server that executes a preconfigured recovery plan to recreate the VMs running at the first location at the second location, and a second host computer in which the recreated VMs at the second location are running.

22. The computer system of claim 8, wherein the first location is a protected site for disaster recovery and the second location is a recovery site for disaster recovery that is remotely located relative to the protected site,
the protected site including the first VM management server, the first recovery management server, and a first host computer in which the VMs at the first location are running, and
the recovery site including the second VM management server, a second recovery management server that executes a preconfigured recovery plan to recreate the VMs running at the first location at the second location, and a second host computer in which the recreated VMs at the second location are running.

23. The non-transitory computer-readable storage medium of claim 15, wherein the first location is a protected site for disaster recovery and the second location is a recovery site for disaster recovery that is remotely located relative to the protected site,
the protected site including the first VM management server, the first recovery management server, and a first host computer in which the VMs at the first location are running, and
the recovery site including the second VM management server, a second recovery management server that executes a preconfigured recovery plan to recreate the VMs running at the first location at the second location, and a second host computer in which the recreated VMs at the second location are running.

* * * * *